United States Patent
Kim et al.

(10) Patent No.: US 11,108,121 B2
(45) Date of Patent: Aug. 31, 2021

(54) CAVITY-TYPE RADIO FREQUENCY FILTER

(71) Applicant: KMW INC., Hwaseong-si (KR)

(72) Inventors: Joung-Hoe Kim, Hwaseong-si (KR); Sung-Ho Jang, Yongin-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 16/666,575

(22) Filed: Oct. 29, 2019

(65) Prior Publication Data
US 2020/0067162 A1    Feb. 27, 2020

Related U.S. Application Data

(63) Continuation of application No. PCT/KR2018/005080, filed on May 2, 2018.

(30) Foreign Application Priority Data

May 2, 2017    (KR) .................. 10-2017-0056359

(51) Int. Cl.
*H01P 1/205*    (2006.01)
*H01P 1/208*    (2006.01)
(Continued)

(52) U.S. Cl.
CPC .......... *H01P 1/2053* (2013.01); *H01P 1/2084* (2013.01); *H01P 7/04* (2013.01); *H01P 7/10* (2013.01)

(58) Field of Classification Search
CPC ........ H01P 1/2053; H01P 1/2084; H01P 7/04; H01P 7/10; H01P 1/207; H01P 7/06; H01P 11/00
(Continued)

(56) References Cited

U.S. PATENT DOCUMENTS 7,005,951 B2 *    2/2006    Motooka .................. H01P 1/00
                                                    333/202
9,397,377 B2 *    7/2016    Seo ........................ H01P 1/2084
(Continued)

FOREIGN PATENT DOCUMENTS

CN            1252860 C       4/2006
CN         102255124 A       11/2011
(Continued)

OTHER PUBLICATIONS

International Search Report for PCT/KR2018/005080 dated Aug. 10, 2018 and its English translation.
(Continued)

*Primary Examiner* — Robert J Pascal
*Assistant Examiner* — Kimberly E Glenn
(74) *Attorney, Agent, or Firm* — Seung Ho Lee

(57) ABSTRACT

A cavity-type radio frequency filter is disclosed. the radio frequency filter having a cavity structure including an enclosure, a resonant element, a cover, a frequency tuning screw, and a resilient fixing member. The enclosure has a hollow inside and an open surface on one side to have a cavity. The resonant element is positioned in the hollow of the enclosure. The cover has a screw hole having a preset diameter at a position corresponding to the resonant element, and is configured to seal the open surface of the enclosure. The frequency tuning screw is configured to be screwed into the screw hole of the cover, and it has an upper end formed at least partially with a latching abutment that protrudes outwardly.

11 Claims, 6 Drawing Sheets

(51) Int. Cl.
*H01P 7/04* (2006.01)
*H01P 7/10* (2006.01)

(58) Field of Classification Search
USPC ........................................................ 333/202
See application file for complete search history.

(56) References Cited

U.S. PATENT DOCUMENTS

| 2013/0266236 A1 | 10/2013 | Dionne |
| 2013/0266396 A1 | 10/2013 | Dionne |

FOREIGN PATENT DOCUMENTS

| CN | 102369632 A | 3/2012 |
| CN | 202402445 U | 8/2012 |
| FR | 2649538 A1 | 1/1991 |
| JP | H04-064816 U | 6/1992 |
| JP | 1997-008512 A | 1/1997 |
| JP | 2003-307208 A | 10/2003 |
| JP | 2013-102331 A | 5/2013 |
| KR | 10-2001-0107673 A | 12/2001 |
| KR | 10-2004-0100084 A | 12/2004 |
| KR | 10-2010-0102378 A | 9/2010 |
| KR | 10-2010-0104679 A | 9/2010 |
| KR | 10-2014-0026235 A | 3/2014 |
| KR | 10-2015-0118768 A | 10/2015 |
| KR | 10-2016-0136783 A | 11/2016 |

OTHER PUBLICATIONS

Extended European Search Report dated Dec. 8, 2020 for European Application No. 18794866.6.

Japanese office action dated Nov. 17, 2020 from Japanese Patent Office for Japanese Application No. 2020-509409 and its English translation.

Chinese office action dated Oct. 9, 2020 from Chinese Patent Office for Chinese Application No. 201880028692.7, and its English translation.

* cited by examiner

CAVITY-TYPE RADIO FREQUENCY FILTER

CROSS-REFERENCE TO RELATED APPLICATION(S)

This application is a Continuation of International Application No. PCT/KR2018/005080, filed on May 2, 2018, which claims the benefit of and priority to Korean Patent Application No. 10-2017-0056359, filed on May 2, 2017, the content of which are incorporated herein by reference in their entirety.

TECHNICAL FIELD

The present disclosure in some embodiments relates to a radio signal processing apparatus for use in a wireless communication system. More particularly, the present disclosure relates to a cavity-type radio frequency filter (hereinafter, abbreviated as 'filter'), such as a cavity filter.

BACKGROUND

A radio frequency filter having a cavity structure generally utilizes a metallic enclosure for providing a plurality of accommodation spaces or cavities having a shape such as rectangular parallelepiped and the like, in which dielectric resonant elements (DR) or resonant elements composed of a metallic resonance rod are each provided for generating superhigh frequency resonance. Further, such cavity-type radio frequency filter is generally provided at its upper portion with a cover for shielding the open areas of the corresponding cavities, where the cover may have, as a configuration for tuning the filtering characteristic of the radio frequency filter, a plurality of tuning screws and nuts for fixing the corresponding tuning screws. An example cavity-type radio frequency filter is disclosed by Korean Patent Application Publication No. 10-2004-100084 (entitled "Radio Frequency Filter" and published on Dec. 2, 2004; inventors: Park, Jonggyu and 2 others) filed by the present applicant.

Those cavity-type radio frequency filters are used for processing radio transmit and receive signals in a radio communication system. Particularly in mobile communication systems, the cavity-type radio frequency filters are typically used for base stations, repeaters or relays and the like.

Meanwhile, Korean Patent Application Publication No. 10-2014-0026235 (entitled 'Radio Frequency Filter with Cavity Structure', published Mar. 5, 2014, and invented by PARK, Nam Sin and 2 others) filed by the present applicant suggests a simplified filter structure for enabling easy frequency tuning without employing a coupling structure of tuning screws and fastening nuts. The above-mentioned Patent Application Publication No. 10-2014-0026235 suggests, when making a cover by pressing, die-casting or other processing of a plate-like base material of aluminum or magnesium material (including an alloy), to form one or more depressions at positions in the cover corresponding to resonant elements. In addition, a plurality of dot peen structures are formed at the depressions by embossing or pressing by embossing pins of an external embossing machine. Such a depression and dot peen structure are intended to replace the coupling structure of tuning screws and fastening nuts which have been conventionally used for frequency tuning, and to achieve appropriate tuning by narrowing the distance between the depression (and the dot peen structure) and the resonant element.

The technique disclosed by the above-mentioned Patent Application Publication No. 10-2014-0026235, which does not employ the conventional coupling structure of tuning screws and fastening nuts, can be compatible for the purpose of making a more compact and lightweight filter structure. In addition, this structure can eliminate Passive Intermodulation Distortion (PIMD) components caused by the discontinuous and non-uniform contact surfaces between the conventional frequency tuning screws and the screw holes of the enclosure, a junction between the dissimilar metals, or other causes.

However, the technique disclosed by the above-mentioned Patent Application Publication No. 10-2014-0026235 is deficient that it requires an external embossing machine for the frequency tuning operation. The method of forming a plurality of dot peen structures at the depressions by embossing or pressing by the external embossing machine actually precludes the possibility of removing the dot peen structures once formed in an attempt to restore the depressions to their original shapes. This makes the frequency tuning operation an irreversible and difficult job to perform.

DISCLOSURE

Technical Problem

Accordingly, the present disclosure in some embodiments seeks to provide a simpler cavity-type radio frequency filter which is simpler, more compact and lighter, and which enables simpler manufacturing operation with lower cost. In particular, the cavity-type radio frequency filter according to at least some embodiments of the present disclosure has a frequency tuning structure that can reversibly perform the frequency tuning operation, thereby making the tuning operation more efficient and easier.

SUMMARY

At least one embodiment of the present disclosure provides a radio frequency filter having a cavity structure including an enclosure, a resonant element, a cover, a frequency tuning screw, and a resilient fixing member. The enclosure has a hollow inside and an open surface on one side to have a cavity. The resonant element is positioned in the hollow of the enclosure. The cover has a screw hole having a preset diameter at a position corresponding to the resonant element, and is configured to seal the open surface of the enclosure. The frequency tuning screw is configured to be screwed into the screw hole of the cover, and it has an upper end formed at least partially with a latching abutment that protrudes outwardly. The resilient fixing member is configured to be caught on the latching abutment of the frequency tuning screw and coupled between the frequency tuning screw and the cover, to be annular and planar in shape having a hollow portion, and to be generally tapered in cross section with a lower outer diameter narrowing into an upper inner diameter toward the hollow portion, and to have a predetermined spring force.

Another embodiment of the present disclosure provides a radio frequency filter having a cavity structure including an enclosure, a resonant element, a cover, and a frequency tuning screw. The enclosure has a hollow inside and an open surface on one side to have a cavity. The resonant element is positioned in the hollow of the enclosure. The cover has a screw hole having a preset diameter at a position corresponding to the resonant element, and it is configured to seal the open surface of the enclosure. The frequency tuning screw is configured to be screwed into the screw hole of the cover. The frequency tuning screw has an upper end formed at least partially with a resilient fixing member having a predetermined spring force, and the resilient fixing member is formed at least partially with a resilient protrusion configured to protrude obliquely outwardly toward a lower end of the frequency tuning screw.

Yet another embodiment of the present disclosure provides a radio frequency filter having a cavity structure including an enclosure, a resonant element, a cover, a frequency tuning screw, and a resilient fixing member. The enclosure has a hollow inside and an open surface on one side to have a cavity. The resonant element is positioned in the hollow of the enclosure. The cover is configured to seal the open surface of the enclosure, to provide a screw hole with a preset diameter at a position corresponding to the resonant element, and to have an upper end formed at least partially with a latching abutment as an overhang. The frequency tuning screw is configured to be screwed into the screw hole of the cover. The resilient fixing member is configured to be caught in the screw hole of the cover on the latching abutment and latched between the frequency tuning screw and the latching abutment, to be annular and planar in shape having a hollow portion, to be generally tapered in cross section with an upper outer diameter narrowing into a lower inner diameter toward the hollow portion, and to have a predetermined spring force.

Yet another embodiment of the present disclosure provides a radio frequency filter having a cavity structure including an enclosure, a resonant element, a cover, and a frequency tuning screw. The enclosure has a hollow inside and an open surface on one side to have a cavity. The resonant element is positioned in the hollow of the enclosure. The cover has a screw hole having a preset diameter at a position corresponding to the resonant element, and configured to seal the open surface of the enclosure. The frequency tuning screw is configured to be screwed into the screw hole of the cover. The cover is formed around the screw hole at least partially with a resilient fixing member having a predetermined spring force and attached to the cover, and the resilient fixing member is formed at least partially with a resilient protrusion configured to protrude downwardly and obliquely inwardly of the screw hole.

Advantageous Effects

As described above, the cavity-type radio frequency filter according to some embodiments of the present disclosure is structured for allowing the frequency tuning operation to be performed reversibly without employing a conventional coupling structure of fastening nuts, which are required when installing conventional frequency tuning screws. The resulting radio frequency filter is more compact and lighter.

DETAILED DESCRIPTION

Figure 1A:
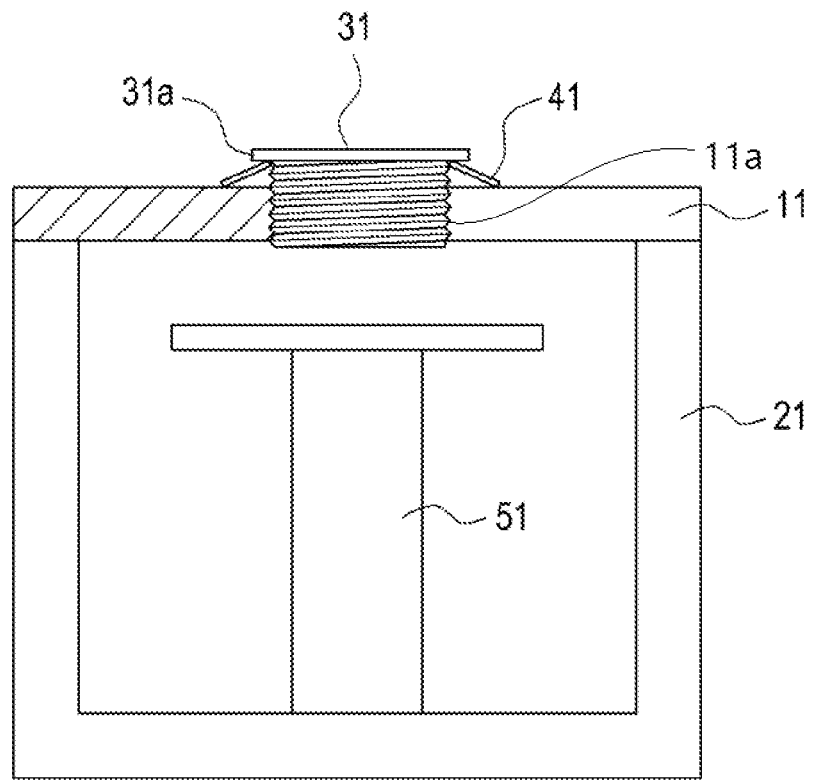
FIG. 1A is a diagram of a cutaway structure of a cavity-type radio frequency filter according to a first embodiment of the present disclosure.

Hereinafter, exemplary embodiments of the present disclosure will be described in detail with reference to the accompanying drawings. In the drawings, like reference numerals refer to like elements as much as possible, and for the convenience of description, the size, shape, and the like are somewhat simplified or partially exaggerated.

Figure 1B:
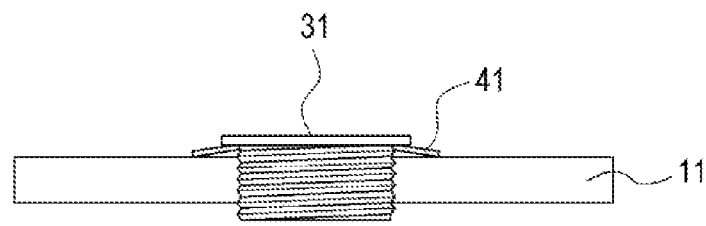
FIG. 1B is a diagram of the frequency tuning screw of FIG. 1A in an illustrative fixed position.
Figure 1C:
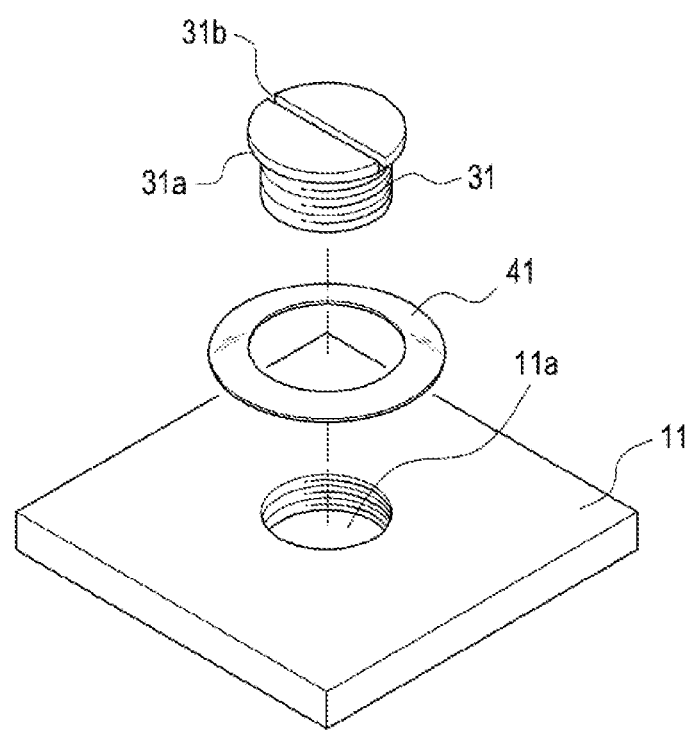
FIG. 1C is an exploded perspective view of frequency tuning components of FIG. 1A.

FIG. 1A is a diagram of a cutaway structure of a cavity-type radio frequency filter according to a first embodiment of the present disclosure. FIG. 1B is a diagram of the frequency tuning screw of FIG. 1A in an illustrative fixed position, e.g., where the frequency tuning screw is tightened. FIG. 1C is an exploded perspective view of frequency tuning components of FIG. 1A. As shown in FIGS. 1A to 1C, the cavity-type radio frequency filter according to the first embodiment has an enclosure 21 having a hollow inside and at least one cavity blocked from outside, similar to a conventional radio frequency filter. The enclosure 21 forming a cavity has one open side (e.g., open top side). In addition, configured to cover the open side of the enclosure 21, a cover 11 is fixedly coupled to the enclosure 21 for sealing thereof. Centrally of the cavity formed in the enclosure 21, a resonant element 51 is fixedly installed on the bottom surface of the enclosure 21.

For convenience of description, FIGS. 1A to 1C illustrate the enclosure 21 as having, for example, a single-cavity structure. However, in addition to such a structure, the enclosure 21 may be configured to have a plurality of cavities connected in multiple stages, and each cavity may have a resonant element at its center. In addition, although not shown in FIGS. 1A to 1C, an input terminal and an output terminal of the radio frequency filter may be formed at one side and the other side of the enclosure 21. When the enclosure 21 is configured to have a plurality of cavities, the input terminal and output terminal may be attached to the enclosure 21 so as to be connected to the input end cavity structure and the output end cavity structure, respectively.

In the above-described configuration, the enclosure 21, the cavity structure formed by the enclosure 21, and the structure of the resonant element 51 may be configured similar to the conventional ones, and both the enclosure 21 and the resonant element 51 may be made of aluminum-based (alloy) material. In addition, the cover 11 according to at least one embodiment of the present disclosure may be made of the same material as that of the enclosure 21, that is, aluminum-based material, similar to the conventional art.

In addition, the surface of cavity-forming portions of the enclosure 21 and the cover 11 may be silver plated.

The focus now turns to a frequency tuning configuration for the radio frequency filter having the above-described structure according to the first embodiment of the present disclosure. The cover 11 is formed with a screw hole 11a of a preset diameter to penetrate the cover 11 at a portion corresponding to the resonant element 51 in the cavity of the enclosure 21. The side surface of the screw hole 11a may be formed with a threaded coupling structure for coupling with a frequency tuning screw 31 for frequency tuning. In other words, the screw hole 11a generally has an internally threaded structure for allowing the frequency tuning screw 31 to be coupled in a threaded manner.

The frequency tuning screw 31 is threadedly fastened to the screw hole 11a, and has its lower end penetrate into the cavity of the enclosure 21 through the screw hole 11a. The frequency tuning screw 31 has at its side a male screw thread to be screwed into the screw hole 11a, and has an appropriately shaped top (or head) drive groove 31b for engaging drive equipment (driver, wrench, etc.) to perform screw tightening operation. In the example of FIG. 1C, the driving groove 31b is illustrated as being slotted, but may have various shapes such as a cross shape and a hexagonal groove. The frequency tuning screw 31 may be made of a forging material such as brass (alloy), it may be silver plated on the surface.

At least a portion of the upper end (head) of the frequency tuning screw 31 protrudes externally to form a latching abutment 31a according to the first embodiment of the present disclosure. The latching abutment 31a may be made by providing the upper end of the frequency tuning screw 31 with a generally enlarged diameter relative to the other part (i.e., the shank).

In addition, the frequency tuning screw 31 is fitted into a ring-shaped resilient fixing member 41 and then coupled to the screw hole 11a of the cover 11. As the frequency tuning screw 31 is tightened, the ring-shaped resilient fixing member 41 is caught by the latching abutment 31a of the frequency tuning screw 31 and is latched in position between the latching abutment 31a of the frequency tuning screw 31 and the upper surface of the cover 11.

The resilient fixing member 41 according to the first embodiment of the present disclosure is formed with a thin plate generally having a ring shape (for example, a hollowed out donut shape), and is generally tapered in cross section with a lower outer diameter narrowing into an upper inner diameter toward the hollow portion. In addition, the resilient fixing member 41 is made of a material such as SUS to have a predetermined resilience and an appropriate strength. The hollow portion of the resilient fixing member 41 is formed to have a diameter with a margin, which is slightly larger than the diameter of the shank of the frequency tuning screw 31 but smaller than the upper end of the frequency tuning screw 31 inclusive of the latching abutment 31a.

With the aforementioned filter structure, the frequency tuning screw 31 in the frequency tuning operation is coupled and tightened to the screw hole 11a of the cover 11 via the resilient fixing member 41. The latching abutment 31a of the frequency tuning screw 31 when tightened presses the resilient fixing member 41. Accordingly, as shown more clearly in FIG. 1B, the resilient fixing member 41 exerts a spring force on the frequency tuning screw 31 through the latching abutment 31a, whereby the frequency tuning screw 31 stays tightened.

As the frequency tuning screw 31 is tightened, the lower end of the frequency tuning screw 31 is pushed toward the resonant element 51 inside the cavity, and the gap is reduced between the lower end of the frequency tuning screw 31 and the resonant element 51. As a result, the capacitance is adjusted between the frequency tuning screw 31 and the resonant element 51 to in turn adjust the characteristics of the corresponding filtering frequency.

At this time, since the resilient fixing member 41 retains some resiliency, the frequency characteristics can be tuned by repeatedly tightening or loosening the frequency tuning screw 31, and at the same time as the frequency characteristic tuning operation, the resilient fixing member 41 maintains and fixates the current state of the frequency tuning screw 31.

Figure 2A:
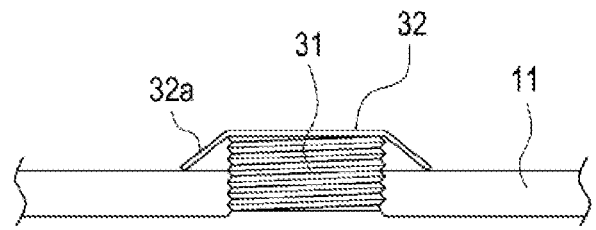
FIG. 2A is a cutaway diagram of frequency tuning parts in a cavity-type radio frequency filter according to a second embodiment of the present disclosure.
Figure 2B:
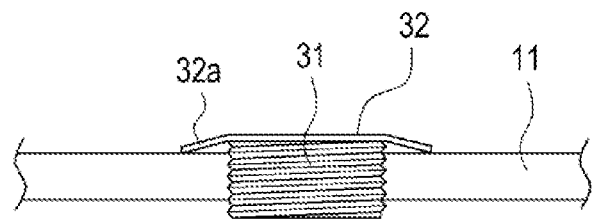
FIG. 2B is a diagram of a frequency tuning screw of FIG. 2A in an illustrative fixed position.
Figure 2C:
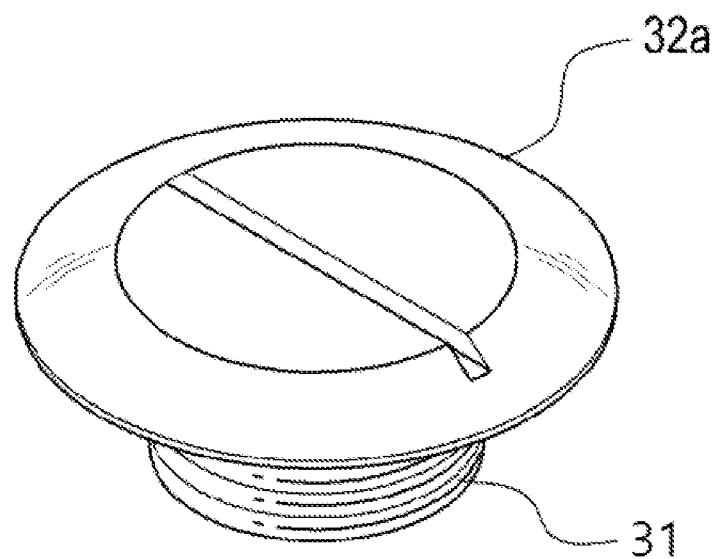
FIG. 2C is a perspective view of the frequency tuning screw of FIG. 2A.

FIG. 2A is a cutaway diagram of frequency tuning parts in a cavity-type radio frequency filter according to a second embodiment of the present disclosure. FIG. 2B is a diagram of a frequency tuning screw of FIG. 2A in an illustrative fixed position, e.g., where the frequency tuning screw is tightened. FIG. 2C is a perspective view of the frequency tuning screw of FIG. 2A. As shown in FIGS. 2A to 2C, the radio frequency filter according to the second embodiment of the present disclosure includes an enclosure (not shown), a cover 11, and others as with the first embodiment, except some differences in the frequency tuning structure.

At least a portion of the upper end of a frequency tuning screw 31 according to the second embodiment is formed with a resilient fixing member 32 of a material having a predetermined spring force. At least a portion of the resilient fixing member 32 is formed with a resilient protrusion 32a configured to protrude externally and obliquely to the lower end. The resilient protrusion 32a of the resilient fixing member 32 may be formed all around the edge at the upper end (head portion) of the frequency tuning screw 31, and is generally tapered in cross section.

The frequency tuning screw 31 has a shank which may be implemented by a forging material such as brass, and the resilient fixing member 32 inclusive of the resilient protrusion 32a may be implemented by a thin metal plate by a material such as SUS, which is then attached to the shank of the frequency tuning screw 31 by laser welding or the like.

In the filter structure as described above, during the frequency tuning operation, the frequency tuning screw 31 combined with the resilient fixing member 32 is coupled to a cover 11 at a screw hole (e.g., 11a of FIG. 1C). As the frequency tuning screw 31 is tightened, as shown more clearly in FIG. 2B, the resilient protrusion 32a of the resilient fixing member 32 combined with the frequency tuning screw 31 at its head is pressed against the upper surface of the cover 11. Accordingly, the frequency tuning screw 31 remains tightened by the spring force of the resilient protrusion 32a.

At this time, since the resilient protrusion 32a retains some resiliency, the frequency characteristics can be tuned by repeatedly tightening or loosening the frequency tuning screw 31.

Figure 3A:
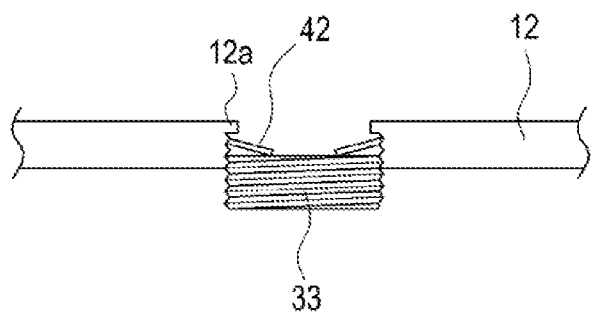
FIG. 3A is a cutaway diagram of frequency tuning parts in a cavity-type radio frequency filter according to a third embodiment of the present disclosure.
Figure 3B:
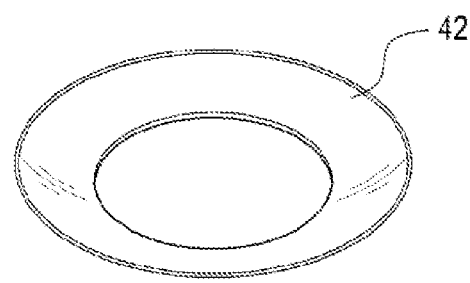
FIG. 3B is a perspective view of a resilient fixing member of FIG. 3A.

FIG. 3A is a cutaway diagram of frequency tuning parts in a cavity-type radio frequency filter according to a third embodiment of the present disclosure. FIG. 3B is a perspective view of a resilient fixing member of FIG. 3A. As shown in FIGS. 3A and 3B, the frequency tuning structure of the radio frequency filter according to the third embodiment of the present disclosure is described. In the third embodiment, a cover 12 is provided with a screw hole having an upper end formed at at least a part thereof with a latching abutment 12a as an overhang. The latching abutment 12a may be formed by having a diameter generally narrower than the rest of the screw hole. In addition, the frequency tuning screw 33 is formed to have a generally constant diameter so as to be coupled to the screw hole of the cover 12.

In the embodiment shown in FIG. 3A, the frequency tuning screw 33 is preinstalled in partial engagement with the screw hole of the cover 12 from inside of a cavity (i.e., under the cover) of an enclosure (not shown). Once the cover is coupled to the enclosure, the external driver equipment engages the frequency tuning screw 33 through a drive groove (not shown) prepared on the upper end thereof to perform the tightening operation of the frequency tuning screw 33.

At this time, a ring-shaped resilient fixing member 42 according to the third embodiment of the present disclosure is installed in the screw hole of the cover 12 so as to be located between the latching abutment 12a and the frequency tuning screw 33. As the frequency tuning screw 33 is tightened toward the resilient fixing member 42, the ring-shaped resilient fixing member 42 is caught by the latching abutment 12a of the cover 12, so that the frequency tuning screw 33 is subject to an application of spring force.

Similar to the structure of the first embodiment, the resilient fixing member 42 is generally composed of a thin plate having a ring shape (e.g., a hollowed-out donut shape), and is generally tapered in cross section with an upper outer diameter narrowing into a lower inner diameter toward the hollow portion. In other words, the resilient fixing member 42 according to the third embodiment is turned upside down into an inverse structure of that of the first embodiment. In addition, the resilient fixing member 42 is made of a material such as SUS to have a predetermined spring force and an appropriate strength.

In the third embodiment, when the frequency tuning screw 33 is tightened for frequency tuning with the resilient fixing member 42 interposed in the screw hole of the cover 12, the latching abutment 12a of the cover 12 depresses the resilient fixing member 42. Accordingly, the resilient fixing member 42 exerts a spring force on the frequency tuning screw 33, thereby keeping the frequency tuning screw 33 in the current tightened state. As with the previous embodiments, the frequency characteristics can be tuned by repeatedly tightening or loosening the frequency tuning screw 33.

Figure 4A:
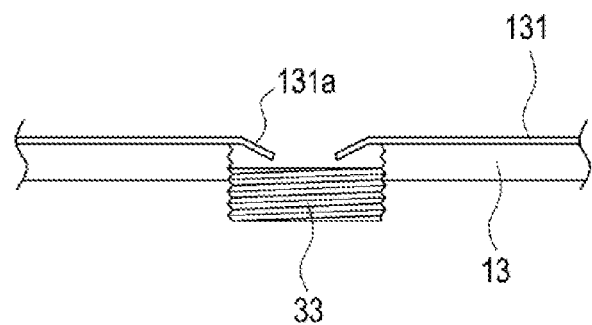
FIG. 4A is a cutaway diagram of frequency tuning parts in a cavity-type radio frequency filter according to a fourth embodiment of the present disclosure.
Figure 4B:
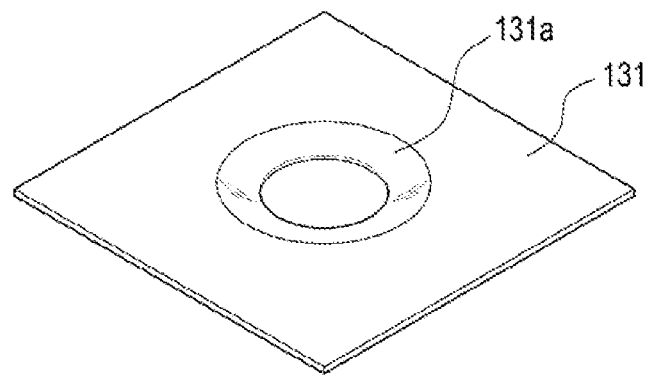
FIG. 4B is a perspective view of an example shape of resilient fixing member of FIG. 4A.
Figure 4C:
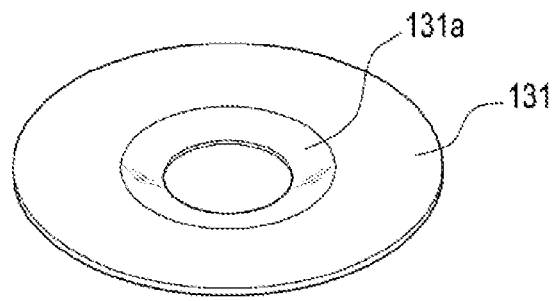
FIG. 4C is a perspective view of another example shape of the resilient fixing member of FIG. 4A.

FIG. 4A is a cutaway diagram of frequency tuning parts in a cavity-type radio frequency filter according to a fourth embodiment of the present disclosure. FIG. 4B is a perspective view of an example shape of resilient fixing member of FIG. 4A. FIG. 4C is a perspective view of another example shape of the resilient fixing member of FIG. 4A. Referring to FIGS. 4A to 4C, the frequency tuning structure of the radio frequency filter according to the fourth embodiment of the present disclosure will be described. In the fourth embodiment, a cover 13 is provided with a screw hole and a resilient fixing member 131 attached to the cover 13 and extending around at least part of the screw hole. FIG. 4B shows an example in which the resilient fixing member 131 is formed in a plate shape having a generally rectangular planar structure, and FIG. 4C illustrates the resilient fixing member 131 as having a generally circular planar structure.

of the resilient fixing member 131 is formed with a resilient protrusion 131a configured to be obliquely projected downward into the screw hole of the cover 13. The resilient protrusion 131a may be formed all around the screw hole of the cover 13, and it is generally tapered in cross section with an upper outer diameter narrowing into a lower inner diameter toward the hollow portion.

The cover 13 may be made of an aluminum (alloy) material, and the resilient fixing member 131 inclusive of the resilient protrusion 131a may be implemented by a thin metal plate with a material such as SUS, which is then attached to the upper portion of the cover 13 at positions corresponding to the screw hole by laser welding or the like. At this time, the frequency tuning screw 33 is formed to have a generally constant diameter so that it may be coupled to the screw hole of the cover 13.

In the embodiment shown in FIGS. 4A to 4C, the frequency tuning screw 33 is similar to the third embodiment shown in FIG. 3A above in that it is preinstalled in partial engagement with the screw hole of the cover 13 from inside of a cavity (i.e., under the cover) of an enclosure (not shown). Once the cover is coupled to the enclosure, the external driver equipment engages the frequency tuning screw 33 through a drive groove (not shown) prepared on the upper end thereof to perform the tightening operation of the frequency tuning screw 33.

In the filter structure as described above, during the frequency tuning operation, the frequency tuning screw 33 is coupled to the screw hole of the cover 13 and then tightened toward the resilient protrusion 131a of the resilient fixing member 131. As the screw 33 is tightened, the resilient protrusion 131a of the resilient fixing member 131 is pressed against the upper surface of the frequency tuning screw 33. Accordingly, the frequency tuning screw 33 is maintained in the current tightened state by the resilient force of the resilient protrusion 131a. As with the previous embodiments, the frequency characteristics can be tuned by repeatedly tightening or loosening the frequency tuning screw 33.

Figure 5:
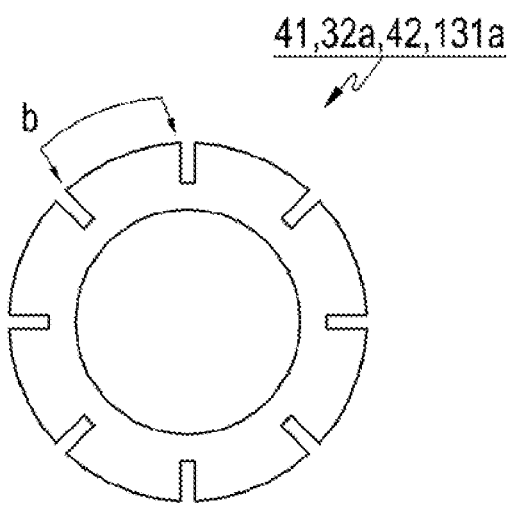
FIG. 5 is a plan view of another modified structure of a main part of resilient fixing members according to embodiments of the present disclosure.

FIG. 5 is a plan view of another modified structure of a main part of resilient fixing members according to embodiments of the present disclosure. The structure of FIG. 5 may be the resilient fixing member 41 according to the first embodiment of FIGS. 1A to 1C as shown in plan view or the resilient fixing member 42 according to the third embodiment of FIGS. 3A and 3B as shown in plan view. Alternatively, the structure of FIG. 5 may be the resilient protrusion 32a of the resilient fixing member 32 according to the second embodiment of FIG. 2A to FIG. 2C as shown in plan view or the resilient protrusion 131a of the resilient fixing member 131 according to the fourth embodiment of FIGS. 4A to 4C as shown in plan view.

As shown in FIG. 5, the resilient fixing members 41 and 42 or the resilient protrusions 32a and 131a of the resilient fixing members may be provided with a plurality of grooves b which may be, for example, inward slits extending some distance from the periphery. The plurality of grooves b may serve to increase the spring force or the restoring force of the resilient fixing members 41 and 42 or the resilient protrusions 32a and 131a of the resilient fixing members. The diameter or length of the plurality of grooves b or other specific detailed structures may be variously designed.

As described above, a cavity-type radio frequency filter may be configured according to embodiments of the present disclosure. The present disclosure encompasses other various embodiments or modifications. For example, the resonant elements may be made as separate components to be attached to the internal floor of the enclosure of the radio frequency filter. Since the enclosure and the resonant element may be made of the same material, they can be integrally formed by a die casting method. Alternatively, as in the technique disclosed by the above-mentioned Patent Application Publication No. 10-2014-0026235, the enclosure and its internal resonant elements may be integrally formed by a pressing process as a whole.

It should be understood that the detailed structure, size, etc. of specific detailed components such as frequency tuning screws, grooves, through holes, etc., as well as the number and shape of cavities provided in the enclosure may be variously changed.

Therefore, various modifications and variations of the present disclosure can be made without departing from the idea and scope of the present disclosure as defined by the appended claims and their equivalents rather than the particularly illustrated embodiments.

The invention claimed is:

1. A radio frequency filter having a cavity structure, comprising:
    an enclosure having a hollow inside and having an open surface on one side to have a cavity;
    a resonant element positioned in the hollow of the enclosure;
    a cover having a screw hole having a preset diameter at a position corresponding to the resonant element, and configured to seal the open surface of the enclosure;
    a frequency tuning screw configured to be screwed into the screw hole of the cover, and having an upper end formed at least partially with a latching abutment that protrudes outwardly; and
    a resilient fixing member configured:
        to be caught on the latching abutment of the frequency tuning screw and coupled between the frequency tuning screw and the cover,
        to be annular and planar in shape having a hollow portion, and
        to be generally tapered in cross section with a lower outer diameter narrowing into an upper inner diameter toward the hollow portion, and
        to have a predetermined spring force, and
    wherein the latching abutment is formed integrally with a region of the frequency tuning screw excluding the latching abutment.

2. The radio frequency filter of claim 1, wherein the resilient fixing member has a plurality of grooves which are inward slits extending from a periphery of the resilient fixing member.

3. A radio frequency filter having a cavity structure, comprising:
    an enclosure having a hollow inside and having an open surface on one side to have a cavity;
    a resonant element positioned in the hollow of the enclosure;
    a cover having a screw hole having a preset diameter at a position corresponding to the resonant element, and configured to seal the open surface of the enclosure; and
    a frequency tuning screw configured to be screwed into the screw hole of the cover,
    wherein the frequency tuning screw has an upper end formed at least partially with a resilient fixing member having a predetermined spring force,
    wherein the resilient fixing member is formed at least partially with a resilient protrusion configured to protrude obliquely outwardly toward a lower end of the frequency tuning screw, and
    wherein an outer end of the resilient protrusion is configured to be pressed by the cover so that the resilient protrusion is elastically deformed.

4. The radio frequency filter of claim 3, wherein the resilient protrusion of the resilient fixing member is formed all around an upper edge of the frequency tuning screw and is generally tapered in cross section.

5. The radio frequency filter of claim 3, wherein the resilient protrusion of the resilient fixing member has a plurality of grooves which are inward slits extending from a periphery of the resilient protrusion.

6. A radio frequency filter having a cavity structure, comprising:
    an enclosure having a hollow inside and having an open surface on one side to have a cavity;
    a resonant element positioned in the hollow of the enclosure;
    a cover configured
        to seal the open surface of the enclosure,
        to provide a screw hole with a preset diameter at a position corresponding to the resonant element, and
        to have an upper end formed at least partially with a latching abutment as an overhang;
    a frequency tuning screw configured to be screwed into the screw hole of the cover; and
    a resilient fixing member configured
        to be caught in the screw hole of the cover on the latching abutment and latched between the frequency tuning screw and the latching abutment,
        to be annular and planar in shape having a hollow portion,
        to be generally tapered in cross section with an upper outer diameter narrowing into a lower inner diameter toward the hollow portion, and
        to have a predetermined spring force.

7. The radio frequency filter of claim 6, wherein the resilient fixing member has a plurality of grooves which are inward slits extending from a periphery of the resilient fixing member.

8. A radio frequency filter having a cavity structure, comprising:
    an enclosure having a hollow inside and having an open surface on one side to have a cavity;
    a resonant element positioned in the hollow of the enclosure;
    a cover having a screw hole having a preset diameter at a position corresponding to the resonant element, and configured to seal the open surface of the enclosure; and
    a frequency tuning screw configured to be screwed into the screw hole of the cover,
    wherein the cover is formed around the screw hole at least partially with a resilient fixing member having a predetermined spring force and attached to the cover, and
    wherein the resilient fixing member is formed at least partially with a resilient protrusion configured to protrude downwardly and obliquely inwardly of the screw hole.

9. The radio frequency filter of claim 8, wherein the resilient protrusion of the resilient fixing member is formed all around the screw hole of the cover and is generally tapered in cross section.

10. The radio frequency filter of claim 9, wherein the resilient protrusion of the resilient fixing member has a plurality of grooves which are inward slits extending from a periphery of the resilient protrusion.

11. The radio frequency filter of claim 8, wherein the resilient protrusion of the resilient fixing member has a plurality of grooves which are inward slits extending from a periphery of the resilient protrusion.

* * * * *